(12) United States Patent
Alderman

(10) Patent No.: US 6,761,519 B2
(45) Date of Patent: Jul. 13, 2004

(54) QUICK DISCONNECT MOTORCYCLE TIE-DOWN SYSTEM

(76) Inventor: Leslie K. Alderman, 67160 Airport Rd., St. Clairsville, OH (US) 43950

( * ) Notice: Subject to any disclaimer, the term of this patent is extended or adjusted under 35 U.S.C. 154(b) by 0 days.

(21) Appl. No.: 10/294,663

(22) Filed: Nov. 15, 2002

(65) Prior Publication Data
US 2003/0103831 A1 Jun. 5, 2003

Related U.S. Application Data
(60) Provisional application No. 60/335,570, filed on Dec. 5, 2001.

(51) Int. Cl.[7] .................................................. B60P 7/08
(52) U.S. Cl. .............................. 410/3; 410/7; 410/23; 410/97; 410/106; 410/110
(58) Field of Search ........................... 410/2, 3, 7, 11, 410/23, 96, 97, 106, 110; 224/534, 568, 924; 248/499

(56) References Cited

U.S. PATENT DOCUMENTS

| | | | |
|---|---|---|---|
| 354,484 A | * 12/1886 | Hannoyer | 224/534 |
| 4,842,458 A | * 6/1989 | Carpenter | 410/3 |
| 5,213,006 A | 5/1993 | Liao | |
| 5,240,023 A | 8/1993 | Shelef et al. | |
| 5,326,202 A | 7/1994 | Stubbs | 410/3 |
| 5,529,448 A | 6/1996 | Kosma | 410/97 |
| 5,701,771 A | 12/1997 | Bailey | |
| 5,915,900 A | * 6/1999 | Boltz | 410/110 |
| 6,065,914 A | 5/2000 | Fotou | 410/3 |
| 6,109,494 A | 8/2000 | Pilmore | |
| 6,152,496 A | 11/2000 | Kouda | |
| 6,171,034 B1 | 1/2001 | Burgoon et al. | 410/3 |
| 6,231,285 B1 | * 5/2001 | Elwell et al. | 410/107 |
| 6,308,590 B1 | 10/2001 | Berto | |
| 6,331,094 B1 | * 12/2001 | Burrows | 410/30 |
| 6,524,041 B1 | * 2/2003 | Voiculescu | 410/100 |
| 2003/0049090 A1 | * 3/2003 | Condon | 410/96 |

* cited by examiner

Primary Examiner—Stephen Gordon

(57) ABSTRACT

An apparatus for securing a motorcycle in an upright position for transport. It consists of a female quick disconnect coupler attached to one end of a tie down strap, used to connect to a male coupler fitting machined as the end of an attachment bolt affixed either inside the open end of the handlebar, or threaded into the motorcycle frame or frame component. This provides a fast, convenient metal to metal securing point at the front end of the motorcycle at the outward end of the handlebars, as well as a coupling point located in another position as may be necessary to secure the motorcycle. Utilization of the quick disconnect coupler system provides the fastest means of attaching the tie down strap in a positive lock, metal to metal connection.

3 Claims, 5 Drawing Sheets

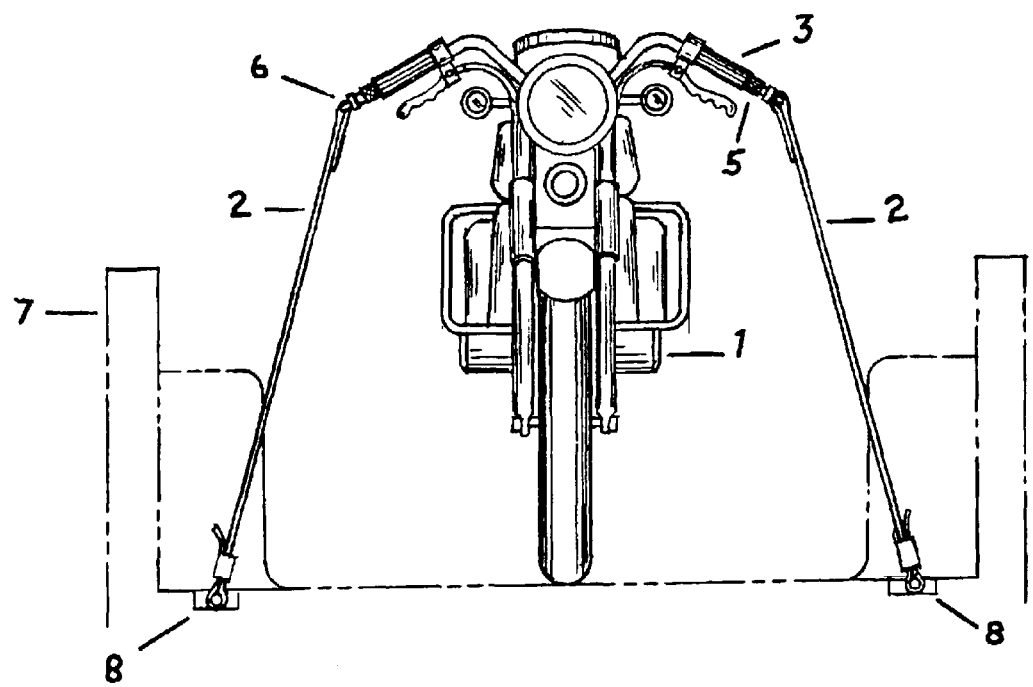
Fig. 1
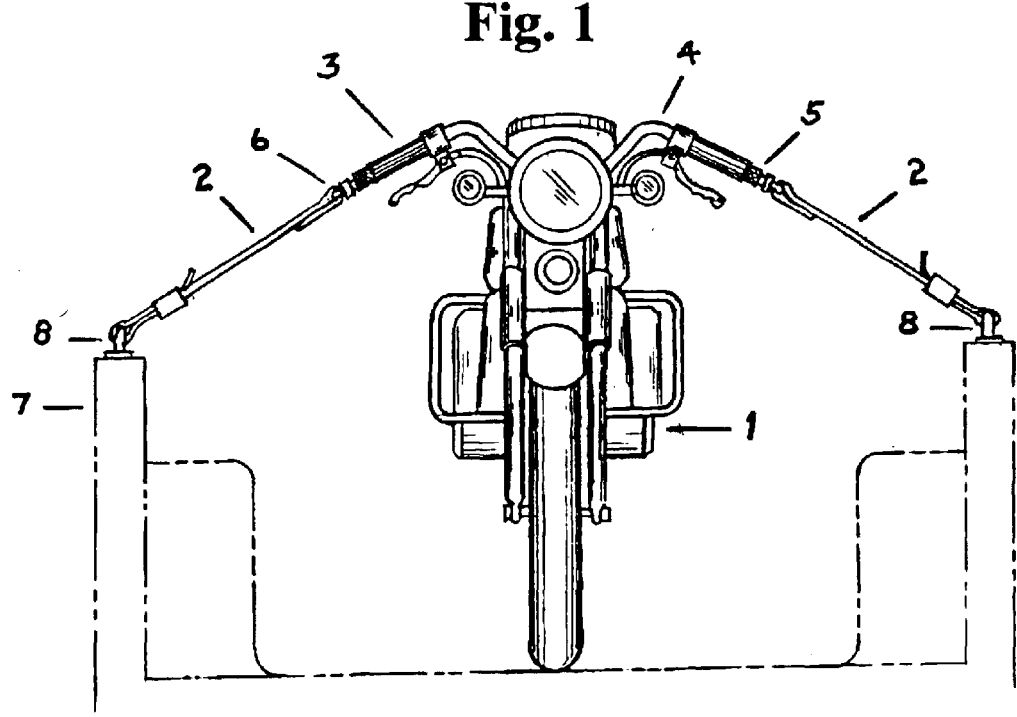

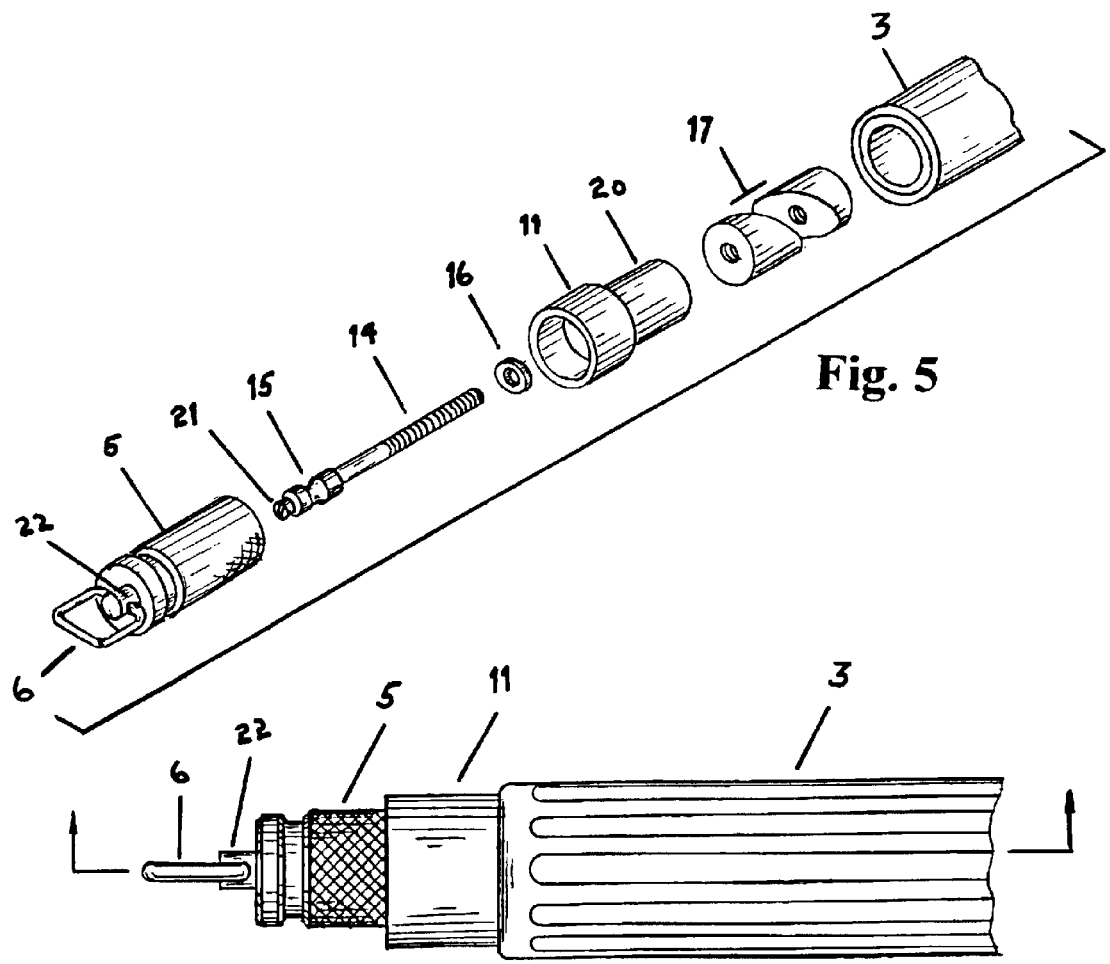

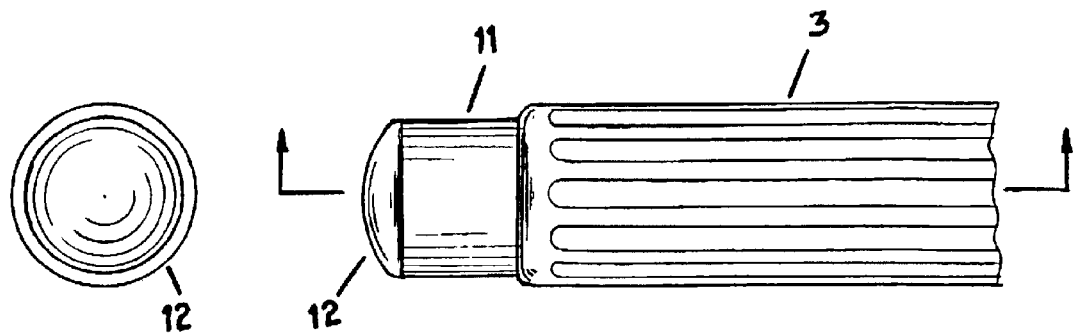
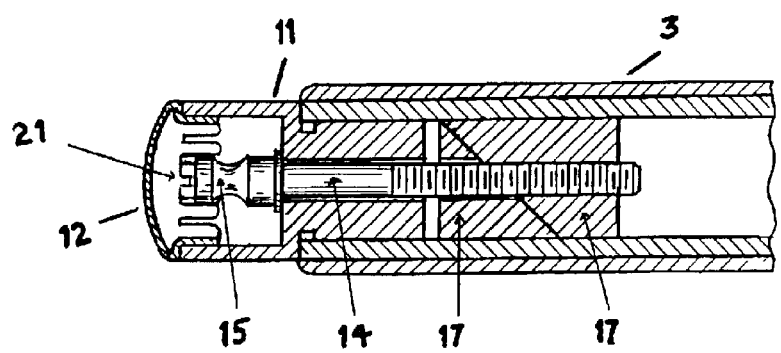
Fig. 8
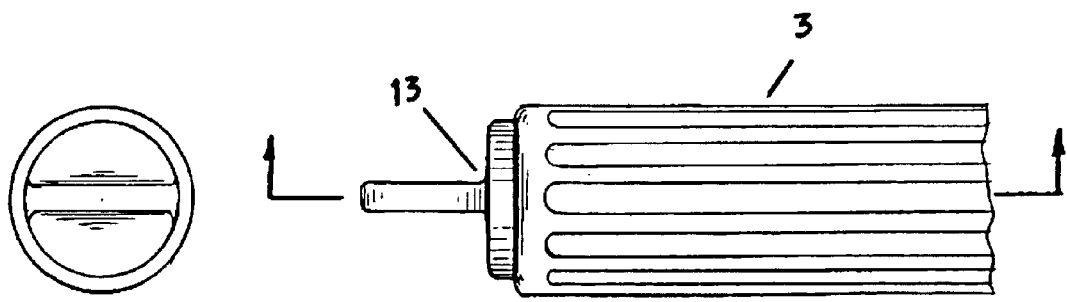
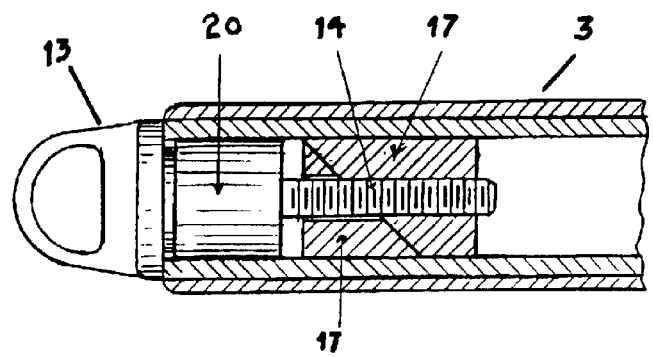
Fig. 9

QUICK DISCONNECT MOTORCYCLE TIE-DOWN SYSTEM

This application claims the benefit of Provisional Application No. 60/355,570, filed Dec. 5, 2001.

BACKGROUND OF THE INVENTION

1. Field of the Invention

This invention relates generally to a tie-down securing method for motorcycles.

2. Prior Art

Motorcycles come in various styles, sizes, and utility function. Some are designed for recreational cruising and travel, while others are designed for performance, racing, or off road use. Invariably at some point in the association with the motorcycling experience it becomes necessary to transport the motorcycle in a truck, or on a trailer. Motorcycles intended for off road use such as dirt bikes or racing motorcycles offer no other legal means of being moved other than on a trailer or in a truck. This necessitates securing the motorcycle in a manner that keeps the motorcycle safely attached to the transport medium while attempting to minimize or eliminate damage to the motorcycle. Typically, the motorcycle is lashed or tied to the transport medium using a combination of straps, ropes, bungee cords, or commercial style tie-down straps.

Numerous devices and methods exist for securing or tying a motorcycle to a transport medium. For example, U.S. Pat. Nos. 6,171,034B1-6,109,494-6,065,914-5,701,771-5,529,448-5,326,202 all offer various methods and equipment intended to provide the securing method necessary to provide stable and secure attachment of the motorcycle to the transport medium. While these prior art devices disclosed in the cited patents do offer a means of securing the motorcycle, they are not without certain limiting and inconvenience factors, most often associated with damage potential as a result of misapplication of the installation or an inherent design oversight. Herewith are two examples. In U.S. Pat. No. 6,065,914 no provision is made that prevents the handlebar Shook attachment device 32 from sliding on the handlebar 50. Any inward movement of the attachment device 32 toward the motorcycle 12 could potentially loosen the apparatus. In U.S. Pat. No. 6,171,034 B1, the shackle 14 is bolted around the motorcycle fork tubes. Potential misapplication of the shackle 14 to a fork tube of a diameter not applicable to the specified application could result in potential indentation damage to the fork tube resultant of over tightening of the bolt 24 in the fastening attempt. The potential for damage to the fork tubes or the whole motorcycle as a result of failure to remove the shackle 14 exists in any possible attempt to operate the motorcycle with these shackles 14 still attached. There is also the additional inconvenience of the installation and removal process of the shackle 14 required of every use. It is therefor desirable to provide a restraint system that not only removes any subjective installation decision making on the part of the user, but makes the process as expedient and uncomplicated as possible.

OBJECTIVES OF THE INVENTION

Accordingly, objectives of the quick disconnect motorcycle tie down system are:

to provide a conveniently located metal to metal attachment point for a motorcycle securing device consisting of a quick disconnect coupling feature, one part of which is incorporated on the end of a nylon or material tie down strap, the other part of which is attached to the motorcycle handlebars, frame, or frame component;

to be very quickly and easily installed or removed;

to provide a multiplicity of applications irrespective of motorcycle manufacturer, model, style, or intended use or function;

to provide an attachment method which eliminates potential damage resultant of contact between the securing straps and the motorcycle.

Additional objectives and advantages of the invention will become apparent to all from a consideration of the drawings and ensuing descriptions.

BRIEF SUMMARY OF THE INVENTION

The applicant has invented a motorcycle securing method incorporating a quick disconnect coupling feature between the securing device, typically a strap, and the motorcycle. Attachment of the quick disconnect male end to the motorcycle can be done in one of two ways. 1.) By inserting a goose neck expander inside the handlebar, secured by utilizing a specially machined bolt incorporating the quick disconnect male end portion as the bolt head, thereby providing both the gooseneck securing bolt and the male quick disconnect fitting in one. This becomes the interconnect attachment point for the female disconnect coupler end of the tie down strap. 2.) By replacement of a motorcycle frame assembly bolt with a bolt incorporating the male quick disconnect fitting as the bolt head, again providing the interconnect attachment point for the female disconnect coupler end of the tie down strap. Incorporation of a quick disconnect coupling feature with the traditional tie down strap arrangement provides both a secure hard point attachment location on the motorcycle itself along with a hard point attachment connection on the end of the tie down strap. Additionally, once the male disconnect coupler-headed bolts are permanently installed on the motorcycle, either inside the handlebar as a part of the internal gooseneck expander, or as a frame replacement bolt, this method of anchoring a motorcycle is devoid of any decision making required of attempting to discern the most potentially damage free and balance point secure location or attachment point on the motorcycle.

BRIEF DESCRIPTION OF THE SEVERAL DRAWING VIEWS

FIG. 1 schematically shows the tie down system in place as a front view of a motorcycle secured in a truck bed utilizing the embodiment of the invention mounted inside the handlebar ends and anchored with the tie down straps to the truck bed floor (top view) or truck bed side (bottom view).

FIG. 5 is an exploded view of the embodiment of the invention showing the component pieces and their relative assembly and fitment relationship.

FIG. 6 shows the motorcycle handlebar with inserted invention embodiment and connected female quick disconnect coupler.

FIG. 7 is a cutaway view of the invention embodiment showing the assembled components fit and in place inside the motorcycle handle bar end with the female quick disconnect coupler attached.

FIG. 8 shows motorcycle handlebar end with cutaway view of installed components (lower drawing) with attached bar end cover cap in place (upper and lower drawing).

FIG. 9 shows a cutaway view (lower drawing) of the optional invention embodiment consisting of the non-disconnecting D-ring bar end tie down strap attachment fitting (upper and lower drawing).

DRAWING REFERENCE NUMERALS

Figure 2:
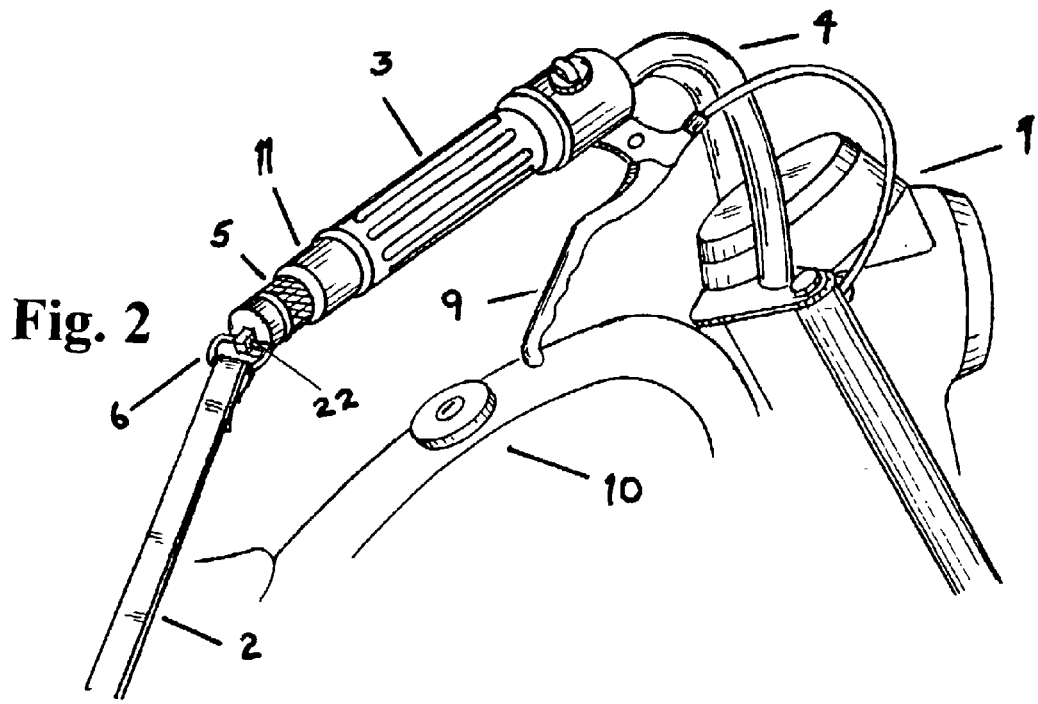
FIG. 2 is a closer view of the embodiment of the invention inserted into the motorcycle handlebar end to which is attached the tie down strap utilizing the quick disconnect coupler.

| | |
|---|---|
| 1. | motorcycle |
| 2. | tie down strap |
| 3. | handlebar grip |
| 4. | handlebar |
| 5. | quick disconnect coupler |
| 6. | D-ring |
| 7. | truck bed |
| 8. | truck bed tie down anchor |
| 9. | brake lever |
| 10. | gas tank |
| 11. | bar end |
| 12. | bar end cap |
| 13. | fixed D-ring style bar end |
| 14. | threaded gooseneck bolt |
| 15. | male detent end of threaded gooseneck bolt |
| 16. | thrust washer |
| 17. | internal gooseneck threaded expander |
| 18. | quick disconnect actuating spring |
| 19. | internal locking detent ball bearings |
| 20. | bar end insert shank |
| 21. | plain end screwdriver slot |
| 22. | D-ring coupling insert |

DETAILED DESCRIPTION OF THE INVENTION

In FIG. 1, a motorcycle 1 containing the preferred embodiment of the invention installed in the handlebar grip 3 is depicted secured to a truck bed 7, and secured using the tie down strap 2 attached to the quick disconnect coupler 5 utilizing the D-ring 6. The tie down strap 2 is then secured to the truck bed anchor 8. Motorcycles are manufactured using a Multiplicity of various handlebar 4 shapes, sizes, styles, and dimensions, without uniformity of handlebar grip 3 size, distance of the grips from each other, or distance from the ground. Depiction of the motorcycle 1 and the included embodiment of the invention is not to be construed as any application specificity limitation concerning the motorcycle 1, the handlebar 4 or handlebar grip 3 size, shape, or dimension.

FIG. 5 shows the exploded view components which comprise the embodiment of the invention. The internal gooseneck threaded expander 17 is comprised of an internally threaded solid metal plug of an outside diameter determined by the application specificity and cut on an angle in such manner as to allow the contact face surfaces of the cut pieces to override each other when tightened together by the threaded gooseneck bolt 14. These pieces are adjoined to the end of the bar end 11 by insertion of the threaded gooseneck bolt 14 through the thrust washer 16 and continuing through the hole in the end of bar end 11 which is manufactured in such manner as to provide a bar end insert shank 20 which is the same diameter as the internal threaded gooseneck expander 17, the diameter being determined by the specific application. Once inserted inside the hollow handlebar grip 3 the assembly is then tightened by means of a screwdriver blade engaged in the plain end screwdriver slot 21 on the end of the threaded gooseneck bolt 14. The tightening force applied to the threaded gooseneck bolt 14 serves to further wedge the internal threaded gooseneck expander 17 inside the hollow handlebar grip 3 as a function of the angular cut of the component pieces.

FIG. 6 shows an external view of the invention embodiment in place inside the handlebar grip with the quick disconnect coupler 5 attached. Incorporated with the quick disconnect coupler 5 is the D-ring 6 attached by means of the D-ring coupling insert 22. The coupling insert 22 would be manufactured in such manner as to allow the D-ring 6 to pivot or move as may be required of the angular plane of attachment determined by the anchor point to which the opposite end of the tie down strap 2 is attached. This insert 22 could be a threaded rod or bolt screwed into the threaded end of the quick disconnect coupler 5, or could be a rod or bolt welded in place in the end of the quick disconnect coupler 5 dependent upon the manufacturing particulars of the coupler. The size, shape and dimension of the D-ring 6 as illustrated is not to be construed as any specificity limitation as may apply to this component of the embodiment of the invention.

FIG. 7 is a cutaway view of the invention embodiment in place inside the handlebar grip 3. The internal gooseneck threaded expander 17 is secured using the threaded gooseneck bolt 14. The threaded gooseneck bolt 14 passes through the thrust washer 16 and the bar end 11. The bar end insert shank 20 is then inserted into the handlebar grip 3, and the components secured in place by tightening of the threaded gooseneck bolt 14. On the end of the threaded gooseneck bolt 14 is the male detent end 15 machined in such manner as to provide the locking surface against which are positioned the internal locking detent ball bearings 19 incorporated inside the quick disconnect coupler 5. A rearward movement of the outside cylindrical housing cover of the quick disconnect coupler 5 against the internal quick disconnect actuating spring 18 allows release of the lock position of the internal locking detent ball bearings 19. The rearward most position of the outside cylindrical housing cover of the quick disconnect coupler 5 allows insertion of the open end of the coupler 5 over the male detent end 15 of the threaded gooseneck bolt 14. Once the outside cylindrical housing cover of the quick disconnect coupler 5 is released, the quick disconnect actuating spring 18 returns the cover to the closed position, forcing the internal locking indent ball bearings 19 into a locked position against the male detent end 15 of the threaded gooseneck bolt 14. The positive lock function of the quick disconnect coupler 5 over the threaded gooseneck bolt 14 is a function of the internal clearance tolerance between the internal detent ball bearings 19 and the threaded gooseneck bolt 14 male detent end 15. This male detent end 15 is manufactured in such manner as to provide a recessed mating surface against which the internal detent ball bearings 19 are recessed and held into position once any rearward actuating force is removed from the outside cylindrical housing cover of the quick disconnect coupler 5. The quick disconnect actuating spring 18 returns the housing cover to the static position which is designed to lock the internal locking detent ball bearings 19 effectively against the male detent end 15 of the threaded gooseneck bolt 14 when so engaged. It is the positive locking aspect of this coupling device which forms the basis of the security this interconnect system offers as it applies to securing a motorcycle for transport.

Figure 4:
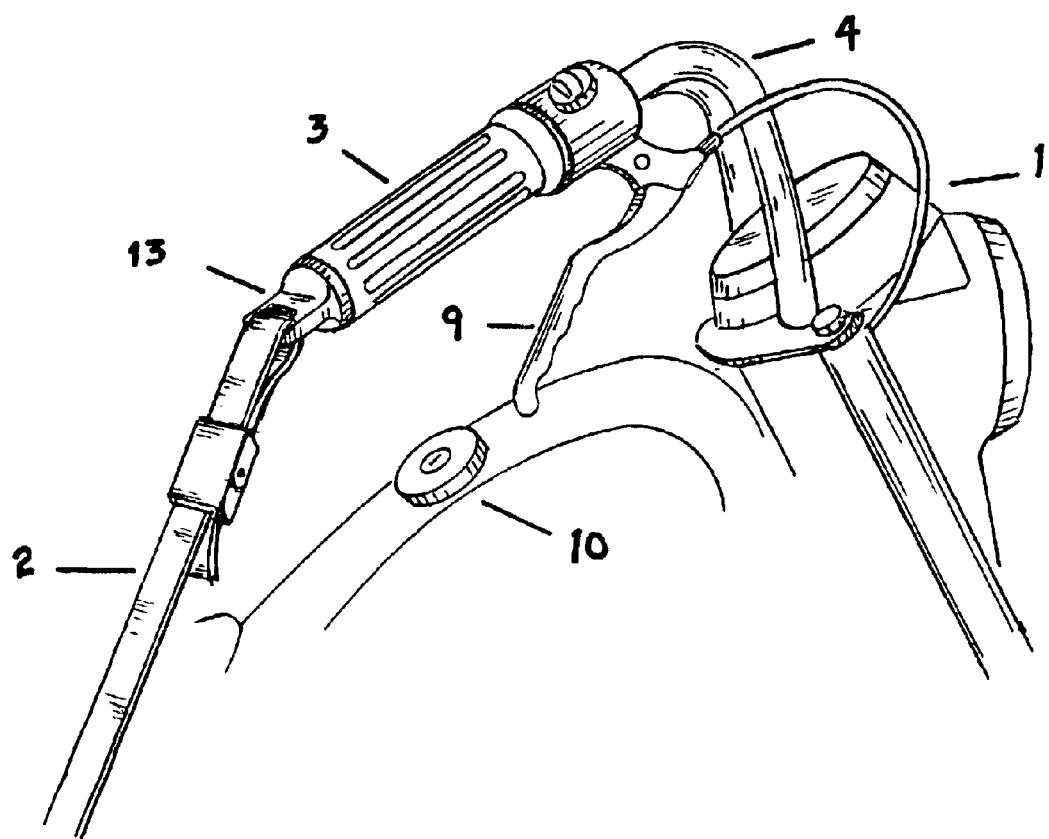
FIG. 4 is a close up view of an optional variation of the invention embodiment using a D-ring style bar end in place of the quick disconnect coupler, thus becoming a permanently installed component through which the tie down strap is inserted.

FIG. 4 and FIG. 9 depict an optional variation of the invention embodiment which employs use of the same internal gooseneck threaded expander 17 tightened with the threaded gooseneck bolt 14 affixed as an extension of the bar end insert shank 20. This bar end insert shank 20 is additionally manufactured incorporating a fixed D-ring style bar end 13 which thus provides a fixed attachment point for the S hook end of any tie down strap 2 as may be such affixed. While not offering the quick disconnect aspect of the preferred embodiment of the invention, it does offer a convenient, readily accessible alternative style access point to which may be affixed a securing strap. FIG. 4 illustrates this installation as it would appear in relation to the handlebar grip 3 while incorporating a threaded-thru style tie down strap 2.

Figure 3:
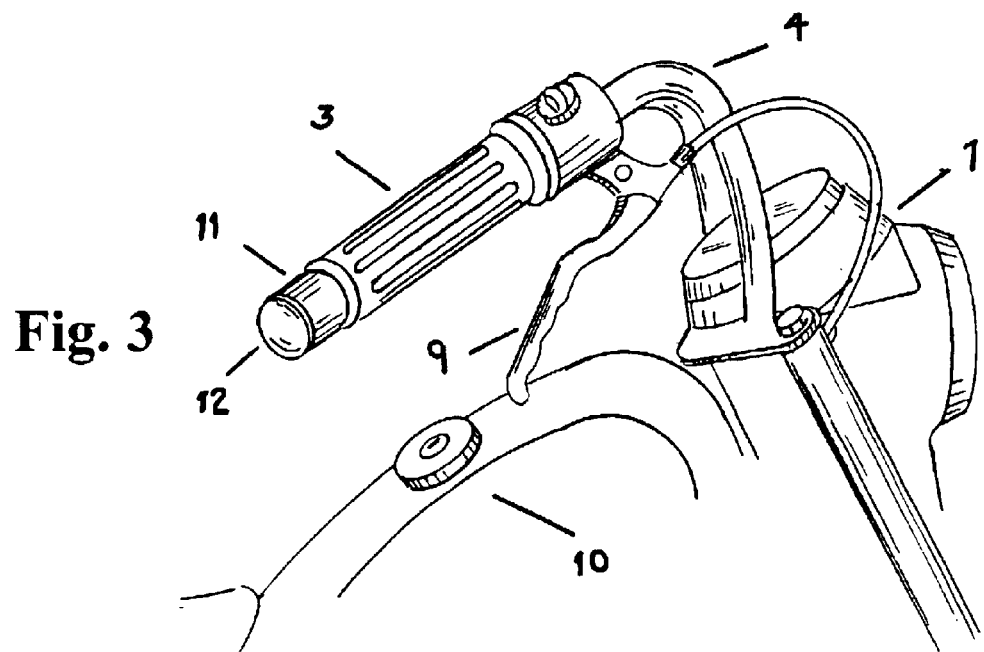
FIG. 3 is a closer view of the embodiment of the invention with the end cover cap in place.

FIG. 8 illustrates the preferred embodiment of the invention with the quick disconnect coupler 5 removed and a snap on bar end cap 12 secured in place. This cap acts as an aesthetic enhancement to the installation while protecting the installed components against the abrasive or contamination effects of any dirt and debris. This bar end cap 12 could be manufactured of plastic, metal, nylon, or any material providing the aesthetics or functionality as may be deemed necessary by virtue of the applicability. FIG. 3 illustrates the embodiment of the invention inclusive of this bar end cap 12.

To secure the motorcycle to a trailer or truck bed, the motorcycle 1 is placed in an upright position in the truck bed 7. The bar end cap 12 is removed and the quick disconnect coupler 5 end of the tie down strap 2 is inserted into the open bar end 11. Rearward actuation of the quick disconnect coupler 5 outside cylindrical housing cover allows engagement of the coupler end with the male detent end 15 of the threaded gooseneck bolt 14. Quick disconnect actuating spring 18 assistance in return of the outside cylindrical housing cover to the forward static position locks the internal locking detent ball bearings 19 in position against the male detent end 15 of the threaded gooseneck bolt 14. Once connected, tightening of the tie down strap 2 against the truck bed anchor 8 secures the motorcycle in position.

An optional alternative method of utilizing the quick coupling aspect of this invention as it applies to securing a motorcycle is to use the threaded gooseneck bolt 14 as a replacement bolt in the frame, or a frame member component of the motorcycle 1. Utilization of an application specific version of this bolt would be threaded and sized in such manner as to become a direct replacement of the chosen frame bolt(s). Incorporating the male detent end 15 of the threaded gooseneck bolt 14 would provide an additional metal to metal securing point on the motorcycle 1. Utilization of this bolt devoid of the components 11 and 17 required of the handlebar grip 3 mount allows esthetic embellishment as may be desired, dependent upon the application. It retains the secure interconnectivity feature afforded the invention by utilization of the quick disconnect coupler 5 equipped tie down strap 2 being positively connected to the male detent end 15 of the bolt.

Installation of both the handlebar grip 3 mounting method of the preferred embodiment of the invention, combined with the optional frame replacement bolt version of the threaded gooseneck bolt 14 on the same motorcycle would provide a fast, convenient, easily used method able to be utilized in a manner that effectively secures both ends of the motorcycle, a situation not afforded by other prior art motorcycle restraint devices.

I claim:

1. A securing device for the purpose of maintaining a motorcycle in an upright position during transport, comprised of and including in combination:

a) an insert manufactured in such manner as to allow insertion into a hollow end of motorcycle handlebar, said insert having:
  a) a pair of angle cut cylindrical components containing a threaded through bore and an outside diameter;
  b) a fitment collar, a portion of which is machined in such manner as to allow insertion into said handlebar end, another portion of which provides an external housing for a securing bolt, said bolt being threaded on one end for the purpose of passing thru a fitment collar internal bore; said bolt securing the angle cut cylindrical components, an end of which is machined in such manner as to include an engagement recess, for the express purpose of engagement of a coupling device;

b.) a flexible tie down strap, on one end of which is affixed a manually operated spring actuated securing device, the coupling device intended to be affixed to the engagement recess, another end of the trap being a free end of the strap;

c.) a means of tightening said tie down strap and provision of a means of attachment of a free end to an anchor point.

2. The securing device apparatus recited in claim 1 wherein the threaded securing bolt is used as a replacement for a structural fastening bolt(s) of the motorcycle frame, thus providing additional interconnect securing points for the tie down strap affixed with the coupling device.

3. The securing device apparatus recited in claim 1 wherein a fitment collar that inserts into the handlebar end, the external portion of which provides a housing for the threaded securing bolt, is affixed with a permanently attached exposed D-ring type opening.

* * * * *